(12) United States Patent
Khan

(10) Patent No.: US 9,380,403 B2
(45) Date of Patent: Jun. 28, 2016

(54) METHODS, SYSTEMS, AND COMPUTER READABLE MEDIA FOR PROVISIONING LOCATION SPECIFIC CONTENT INFORMATION TO A MOBILE DEVICE

(75) Inventor: Mohammad Khan, San Jose, CA (US)

(73) Assignee: MasterCard International Incorporated, Purchase, NY (US)

(*) Notice: Subject to any disclaimer, the term of this patent is extended or adjusted under 35 U.S.C. 154(b) by 0 days.

(21) Appl. No.: 13/267,591

(22) Filed: Oct. 6, 2011

(65) Prior Publication Data

US 2012/0088487 A1 Apr. 12, 2012

Related U.S. Application Data

(60) Provisional application No. 61/390,450, filed on Oct. 6, 2010.

(51) Int. Cl.
| | | |
|---|---|---|
| *H04M 3/00* | (2006.01) | |
| *H04W 4/00* | (2009.01) | |
| *H04W 4/02* | (2009.01) | |
| *G06Q 20/20* | (2012.01) | |

(Continued)

(52) U.S. Cl.
CPC ............ *H04W 4/001* (2013.01); *G06Q 20/20* (2013.01); *G06Q 20/322* (2013.01); *G06Q 20/3224* (2013.01); *G06Q 20/3278* (2013.01); *H04W 4/021* (2013.01); *H04W 4/008* (2013.01); *H04W 4/18* (2013.01)

(58) Field of Classification Search
CPC ..... H04W 4/001; H04W 4/021; H04W 4/008; H04W 4/18; G06Q 20/20; G06Q 20/322; G06Q 20/3224; G06Q 20/3278
See application file for complete search history.

(56) References Cited

U.S. PATENT DOCUMENTS

2002/0133545 A1* 9/2002 Fano et al. .................. 709/203
2003/0216960 A1* 11/2003 Postrel .......................... 705/14

(Continued)

FOREIGN PATENT DOCUMENTS

| KR | 10-2010-0038344 | 4/2010 |
|---|---|---|
| WO | WO 2008/147085 A2 | 12/2008 |

OTHER PUBLICATIONS

Notification of Transmittal of the International Search Report and the Written Opinion of the International Searching Authority, or the Declaration for International Application No. PCT/US2011/055124 (Feb. 27, 2012).

(Continued)

*Primary Examiner* — Keith Fang
(74) *Attorney, Agent, or Firm* — Jenkins, Wilson, Taylor & Hunt, P.A.

(57) ABSTRACT

Methods, systems, and computer readable media for provisioning location specific content information to a mobile device are disclosed. In one example, a method includes detecting the presence of a mobile device at a designated area and receiving a location identifier associated with the designated area and a mobile device user identifier associated with the mobile device at a backend server. The method further includes utilizing the location identifier to obtain local flavor content data, wherein the local flavor content data provides customized information specific to the designated area, providing the local flavor content data to the mobile device using the mobile device user identifier, and applying the local flavor content data to a generic application in the mobile device to generate a local flavor application that is customized for use at the designated area.

12 Claims, 3 Drawing Sheets

(51) Int. Cl.
*G06Q 20/32* (2012.01)
*H04W 4/18* (2009.01)

(56) References Cited

U.S. PATENT DOCUMENTS

2005/0222961 A1* 10/2005 Staib et al. .................... 705/64
2006/0270419 A1 11/2006 Crowley et al.
2007/0083439 A1* 4/2007 Petrovich ...................... 705/26
2009/0143104 A1* 6/2009 Loh et al. ..................... 455/558

OTHER PUBLICATIONS

"Information technology—Telecommunications and information exchange between systems—Near Field Communications—Interface and Protocol (NFCIP-1)," ISO/IEC 18092, pp. 1-66 (Apr. 1, 2004).

"Identification cards—Contactless integrated circuit(s) cards—Proximity cards—Part 2: Radio frequency power and signal interface," ISO/IEC 14443-2, pp. 1-10 (Jul. 22, 2003).

"Identification cards—Contactless integrated circuit(s) cards—Proximity cards—Part 4: Transmission protocol," ISO/IEC 14443-4, pp. 1-39 (Mar. 10, 2000).

"Identification cards—Contactless integrated circuit(s) cards—Proximity cards—Part 3: Initialization and anticollision," ISO/IEC 14443-3, pp. 1-48 (Jun. 11, 1999).

Communication of European publication number and information on the application of Article 67(3) EPC for European Application No. 11831605.8 (Jul. 17, 2013).

* cited by examiner

METHODS, SYSTEMS, AND COMPUTER READABLE MEDIA FOR PROVISIONING LOCATION SPECIFIC CONTENT INFORMATION TO A MOBILE DEVICE

PRIORITY CLAIM

The present application claims the benefit of U.S. Provisional Patent Application Ser. No. 61/390,450, filed Oct. 6, 2010, the disclosure of which is incorporated herein by reference in its entirety.

TECHNICAL FIELD

The subject matter described herein relates to near field communication (NFC) and provisioning location specific data to a mobile device. More particularly, the subject matter described herein relates to methods, systems, and computer readable media for provisioning location specific content information to a mobile device.

BACKGROUND

At present, mobile device users are utilizing a number of specific applications preloaded on their mobile devices (e.g., smartphones, PDAs, and other mobile devices) to view specific information of the physical environments they are currently visiting, such as shopping centers and malls, merchant stores, restaurants, parks, museums, train stations, airports, stadiums/arenas, libraries, and the like (i.e., use of a single provisioned application for each location/site). Notably, a user is compelled to carry dozens of applications on a smartphone to benefit from all places the mobile device user frequently visits. Consequently, the process of accessing the proper application at any given time can be cumbersome for the user since the user has to find a specific application among a number of various applications to launch each time the mobile device user wants information pertaining to a visited location or physical site.

Accordingly, there exists a need for methods, systems, and computer readable media for provisioning location specific content information to a mobile device.

SUMMARY

According to one aspect, the subject matter described herein includes methods, systems, and computer readable media for provisioning location specific content information to a mobile device. In one embodiment, a method includes detecting the presence of a mobile device at a designated area and receiving a location identifier associated with the designated area and a mobile device user identifier associated with the mobile device at a backend server. The method further includes utilizing the location identifier to obtain local flavor content data, wherein the local flavor content data provides customized information specific to the designated area, providing the local flavor content data to the mobile device using the mobile device user identifier, and applying the local flavor content data to a generic application in the mobile device to generate a local flavor application that is customized for use at the designated area.

As used herein, the terms "wireless smart device" and "NFC enabled device" may be synonymous and are intended to refer to any device enabled with near field communication (NFC), radio frequency (RF) communication, or barcode capturing capabilities to interact with an NFC smart poster, a wireless device reader, or a wireless device writer with the corresponding technology. In one aspect, wireless device reader and/or writer may include a radio frequency (RF) reader and/or writer. One type of wireless device that can wirelessly communicate to a wireless smart device reader is an NFC card or NFC handheld device, including but not limited to a smartphone. In near field communication, a wireless smart device may communicate with a wireless transceiver or wireless device reader via inductive coupling of the reader antenna to the device antenna. The two loop antennas effectively form a transformer. The reader amplitude-modulates the radio frequency (RF) field to send information to the device. The device communicates with the transceiver and/or reader by modulating the loading on the device antenna, which also modulates the load on the reader antenna. In a wireless smart device, the NFC handset may enable contactless payment, and a security element (SE) for ensuring secure transactions may be embedded, provided by a universal subscriber identity module (USIM), or provided as an add-on to, for example, a SD or a jacket. Wireless smart devices may communicate with a transceiver or wireless device reader using NFC. As used herein, the term "wireless communication" includes communication conducted at ISO 14443 and ISO 18092 interfaces. These specifications define communication protocols for wireless smart devices operating in close proximity with a reader antenna.

The subject matter described herein may be implemented in software in combination with hardware or in software in combination with hardware and firmware. For example, the subject matter described herein may be implemented in software executed by a hardware based processor. In one exemplary implementation, the subject matter described herein for provisioning location specific content information to a mobile device may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
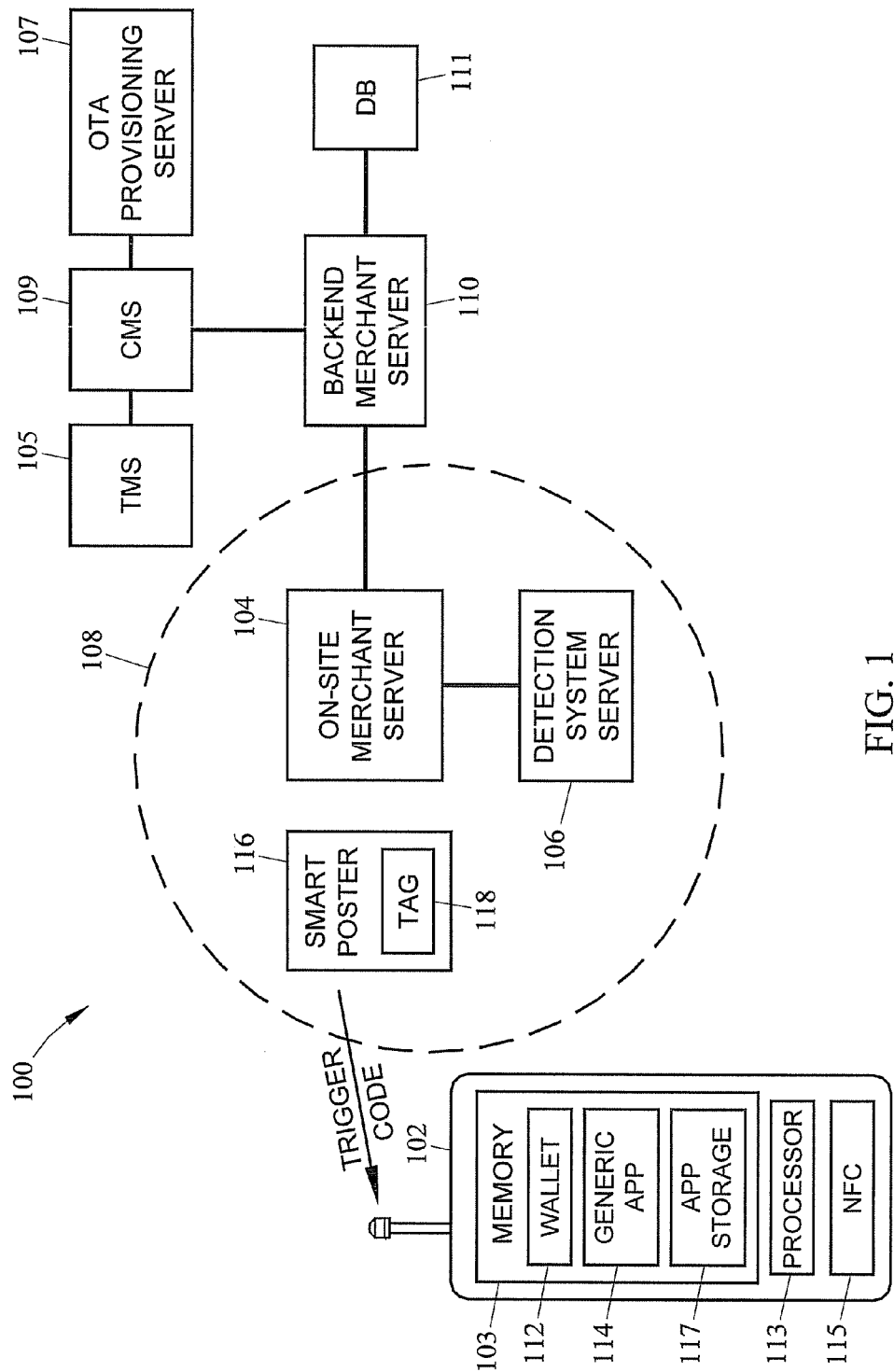
FIG. 1 is a block diagram illustrating an exemplary system for provisioning location specific content information to a mobile device according to an embodiment of the subject matter described herein.

The present subject matter enhances a mobile device user's experience with little effort on the user's part by providing customized information specifically related to the physical location or site the user is visiting. Notably, the present subject matter enables mobile device users to "check-in" into a specific local physical environment and subsequently enjoy that specific environment by receiving information customized to that specific environment. Exemplary environments include shopping centers and malls, merchant stores, restaurants, parks, museums, train stations, airports, stadiums, theaters, arenas, libraries, residential areas, and the like.

In one embodiment, a mobile device user may tap or interface a near field communications (NFC) enabled mobile device on a touch point, such as a passive NFC contactless tag or NFC contactless reader/writer (e.g., a point of sale terminal), to obtain a location identifier (or location information) associated with the physical location/site the mobile device user is visiting. The NFC mobile device may then use the location identifier to obtain and/or execute a mobile device application with a customized "local flavor" that represents that specific location. As used herein, "local favor" is intended to mean a user experience that comprises customized information (i.e., location specific content information) related to a specific physical environment, location, or site that is visited by a mobile device user. Similarly, local flavor content data is information associated with the local flavor that is presented via a mobile device application to a mobile device user based on the specific location the mobile device user is presently visiting. In an alternate embodiment, an automatic detection system may be used to detect the presence of a mobile device user (e.g., a customer) at a designated location (e.g., a merchant store). The automatic detection system may utilize any range based or triangulation based technology to detect the presence of a user's mobile device, such as WiFi, Bluetooth, WiFi triangulation, cellular triangulation, or GPS triangulation.

For example, a smartphone running a local flavor application may be able to provide location specific information that aids the mobile device user to find a particular shop in a mall, a specific product in a store, a particular seat in a theater, the specific train in train station, and the like. Similarly, a mobile device user's application running on the mobile device may provide even more specific information of sub-areas/sites in a particular location, e.g., by tapping on a NFC passive tag or NFC reader in a specific department within a particular store, a specific display area within a museum, a specific aisle in a grocery store, and the like. For example, a mobile device may tap an NFC poster at a department store and receives local flavor content data associated with the department store. Local flavor content data may include electronic coupons applicable to merchandise in that particular store, a map of the different sections or aisles in that particular store, and/or promotional or sale information (e.g., an electronic ad booklet) for that day.

In one embodiment, the present subject matter may include a wallet application client that resides on a mobile device that is configured to adopt a particular local flavor. The wallet application client may execute the local flavor content data by reading the information either from an NFC tag or NFC reader. In one embodiment, mobile devices will send the information (e.g., a location identifier) to back-end servers to request local flavor content data. Local flavor content data may include either a local flavor application trigger code that initiates a stored local flavor application within a mobile device, or a local flavor application module that may be downloaded and run on the mobile device in real time (thus, the mobile device does not need to store all various merchant store/location-specific applications).

The mobile device may also be configured to read the tag information from touch point, such an NFC tag or NFC reader to trigger a local flavor application. Notably, a mobile device may use the tag information from a touch point to trigger a selection of a local flavor application from a list of local flavor applications stored in the mobile device without the use or assistance of backend servers located in the network cloud. Once the physical location or site is identified by the mobile device, the behavior of the wallet application client and supported functions on the smartphone may be fine-tuned to the related local flavor. For example, a mobile device user visiting an ABC grocery store may tap (using the NFC enabled mobile device) an NFC tag or NFC reader installed in the store. By doing so, the mobile device receives tag information (e.g., a tag location code) which is processed by a wallet application client running on smartphone mobile device. In one embodiment, a generic application utilized by the wallet application will acquire a local flavor of that local ABC grocery store. For example, the local flavor application executed by the wallet application client may make recipe suggestions to the mobile device user when the mobile device is tapped on an NFC shelf tag associated with a product carried by that particular ABC grocery store (e.g., a product tag on a spice jar or a shelf tag associated with the spice jar).

In another embodiment, the present subject matter may enable a mobile device user visiting a particular office building to obtain associated map information. For example, a user may interface a mobile device with a smart poster installed in the lobby of the office building. As a result, a customized application on the mobile device will be automatically launched or local flavor content data may be downloaded from a backend server via an over the air (OTA) provisioning server. The customized location flavor content data or application may show the user the layout of the office building showing elevators, what floor and suite a particular law office or restaurant is located, or where the restrooms are located.

FIG. 1 is a schematic diagram illustrating an exemplary system 100 for provisioning location specific content information to a mobile device according to an embodiment described herein. Referring to FIG. 1, exemplary system 100 includes, a mobile device 102 (e.g., a wireless smart device), a smart poster 116, an on-site merchant server 104, a detection system server 106, a backend merchant server 110 and associated database 111, a trigger management server (TMS) 105, a content management server 109, and an over the air (OTA) provisioning server 107. Although FIG. 1 depicts "merchant" servers, merchant servers 104 and 110 may each be a server configured to contain and manage data associated with non-merchant entities, such as a library, museum, theater, stadium, residential area, or the like without departing from the scope of the present subject matter. Although not shown, system 100 may also include other network elements that may be used to facilitate the provisioning of location specific content information (i.e., local flavor content data).

In one embodiment, mobile device 102 includes a near field communications (NFC) enabled mobile device or smartphone that is configured to wirelessly communicate via NFC. Notably, mobile device 102 may include a hardware based NFC module 115 that enables mobile device 102 to send and receive NFC signals. Mobile device 102 may also include a wallet application 112 that is used to manage and utilize local flavor content data or local flavor applications. In one embodiment, wallet application 112 includes a software application that resides in a memory 103 or a hardware storage component in mobile device 102 and may be executed by a hardware processor 113 in mobile device 102. Wallet application 112 may be configured to manage and execute a generic application 114 or any one of a plurality of local flavor applications (or local flavor content data) stored in application storage 117. In one embodiment, memory 103 may comprise at least one of a secure memory element and/or a non-secure baseband memory.

Although FIG. 1 only shows a smart poster 116, any touch point associated with a designated site or location may be used without departing from the scope of the present subject matter. For example, a touch point may include any object capable of being interfaced with an NFC enabled mobile device and is located in a place that is readily accessible by potential customers of goods and/or services. Exemplary touch points include an NFC smart poster, a barcode poster or chart, quick response (QR) code poster, an NFC wireless reader and/or writing device, a radio frequency (RF) device reader/writer, a passive RF tag (e.g., a product tag or shelf tag), a short code poster, a wireless device reader, a wireless device writer, a point of sale device, and the like. A touch point, e.g., smart poster 116, may be located inside and/or near a merchant establishment or designated area 108. Designated area 108 may include any one of a store/restaurant entrance, a designated pickup area, a parking spot, a dining room table, and the like. For example, smart poster 116 may be located at a store or venue entrance, on a store wall, or on a product or shelf (e.g., as a shelf tag or a product tag) or other easily accessible location in or near the store or venue. In another embodiment, a smart poster 116 may be located adjacent to an associated parking area or parking spot near a merchant establishment. Upon interfacing with a touch point, mobile device 102 may obtain an associated location identifier that may be used to obtain local flavor content data. Alternatively, mobile device 102 may instead receive a local flavor application trigger code upon interfacing with a touch point.

In one embodiment, a mobile device user's presence and mobile device 102 may be detected. In one embodiment, the mobile device user's presence and/or arrival to the merchant location may be detected upon mobile device 102 interfacing (via NFC) with a smart poster 116, such as a smart poster or wireless device reader/writer at, for example, a store entrance, a dining table, or parking spot. Alternatively, the mobile device user's presence and mobile device 102 may automatically be detected at the merchant location by detection system server 106 when mobile device 102 enters a designated area 108 associated with a merchant entity. GPS triangulation, GSM triangulation, or WiFi triangulation methods applied to mobile device 102 could be used to determine when mobile device 102 is present in a certain location, such as a Macy's® store (e.g., when device 102 is interfaces with a wireless reader in Macy's®). User preferences can be used to prioritize electronic softcards residing within wallet application 112. Both of these embodiments may utilize a wallet application 112 stored in mobile device 102. In one embodiment, wallet application 112 may include a software application or module (e.g., a MIDlet application) that is stored in memory 103 (either in a secure memory element and/or non-secure baseband memory) of mobile device 102, and when executed by a hardware based processor in mobile device 102 is capable of performing various functionalities. Wallet application 112 may be used to communicate information to TMS 105 and receive provisioned data from OTA provisioning server 107.

As mentioned above, mobile device 102 may be detected when the user interfaces mobile device 102 (e.g., taps) with smart poster 116, which may include a smart tag 118 that comprises a passive NFC or RF tag device (e.g., a circuit device or wireless transceiver) that is powered by an interfacing mobile device 102. Notably, a customer may utilize smart poster 116 to "check-in" and notify a merchant entity of his presence at a designated location by interfacing mobile device 102 via NFC (e.g., an NFC tap) with smart poster 116. In one embodiment, NFC hardware module 115 and may be utilized by mobile device 102 to interface with smart poster 116 or a wireless device reader/writer using near field communications. For example, after mobile device 102 is tapped or brought in close proximity with smart tag 118, smart tag 118 may be activated by obtaining power from the electromagnetic field generated by mobile device 102. In other embodiments, smart tag 118 may include an active RF tag or reader equipped with its own power source (e.g., a battery). Whether passive or active, smart tag 118 is capable of communicating smart poster content information to an interfacing mobile device 102. In one embodiment, the smart tag content information may include a tag location code (TLC) and/or a location identifier (e.g., an IP address, a URL, a URI, and the like) associated with TMS 105, all of which may be provided to a mobile device 102 via NFC. In an alternate embodiment, the location identifier may be associated with a backend merchant server 110 (thereby, communication may occur directly between mobile device 102 and backend merchant server 110).

In one embodiment, mobile device 102 may initiate wallet application 112 upon interfacing with smart tag 118 on smart poster 116. In such an embodiment, a mobile device user may tap mobile device 102 to smart poster 116 and wirelessly receive information including a location identifier (e.g., URL, IP address, or URI) associated with TMS 105, a TLC, which corresponds to a specific location of the touch point (e.g., a site specific to the location identifier) and which identifies, for example, a specific merchant and/or backend merchant server. In one embodiment, a mobile device user may trigger wallet application 112 to wirelessly receive a TLC (which, e.g., identifies the merchant entity) by interfacing mobile device 102 with smart tag 118 on smart poster 116. For example, after interfacing with smart poster 116, mobile device 102 may initiate a wallet client application 112 (e.g., a software client, such as a midlet client application program, executed by a mobile phone processor) that is responsible for transmitting location identifier information and user identification information to CMS 109 in a local flavor content request message. For example, the wallet client may send the location identifier information to CMS 109 to request the local flavor application (or a local flavor trigger identifier) that is associated with the store hosting the interfaced touch point.

In one embodiment, wallet application 112 may use a server address (e.g., a URL, URI, or IP address) provided by smart poster 116 to communicate with trigger management server 105, CMS 109, or backend merchant server 110 in order to inform a merchant entity of the customer's presence and/or arrival at a designated location (e.g., a store, a fast food restaurant, café, and the like). For example, a wallet application 112 may be configured contact a trigger management server 105 using the URI and provide TMS 105 with both the TLC and mobile user identifier. TMS 105 may use the TLC to determine the appropriate merchant entity and corresponding merchant server associated with the smart poster that provided the TLC (e.g., by accessing a database of merchant identities mapped to merchant server addresses). Once an appropriate merchant server (e.g., merchant server 116) is determined, TMS 105 may forward the TLC along with the mobile user identifier to backend merchant server 110. Using the TLC, the server may obtain the local flavor content data. In one embodiment, database 111 may include entries that map the local flavor content data with TLCs. Upon finding the local flavor content data corresponding to the TLC, server 110 may provide the local flavor data along with a mobile device user phone number (e.g., mobile device user identifier) to OTA provisioning server 107.

In one embodiment, OTA provisioning server 107 may provide the local flavor application module using an over the internet (OTI) server path/channel to mobile device 102 since the notification message comprises low security data. Notably, the OTI channel allows for faster communication with low security overhead. In an alternate embodiment, backend merchant server 110 and/or TMS 105 may directly communicate the application module or trigger code to mobile device 102 via a WiFi channel.

OTA provisioning server 107 may include any server that is responsible for providing local flavor content data to mobile devices (e.g., NFC mobile device 102) per the instructions and information received from CMS 109 or any other network element in system 100. The functions provided by OTA provisioning server 107 may include providing OTA administrative services for the secure element on a mobile device, and providing a secure local provisioning point for providing local flavor content data to a mobile device. In one embodiment, OTA provisioning server 107 may be embodied as a plurality of servers as opposed to a single stand-alone server as shown in FIG. 1. In one embodiment, the OTA interface protocol used by OTA provisioning server 107 and a mobile device with wireless communications capabilities may vary with the device. Examples of OTA interface protocols that may be used include IP related protocols, WiFi, GSM, GPRS, CDMA, Bluetooth, BIP (Bearer Independent Protocol), SMS PP, and the like.

In one embodiment, mobile device 102 may be detected when mobile device 102 is brought within a designated area 108 associated with a merchant location. In such embodiments, a mobile device user associated with mobile device 102 may register with the merchant entity and provide a registered/recognizable mobile device user identifier (e.g., an Internet protocol (IP) address or a telephone number) associated with mobile device 102 such that a detection system server 106 may be permitted to wirelessly detect mobile device 102 entering or activated within designated area 108. In an alternate embodiment, a hardware component (e.g., a hardware circuit) may be added to mobile device 102 to enable detection by system 106.

For example, designated area 108 may be associated with a store location or entrance, a parking lot location, a stadium, a theater, an airport, a restaurant, and the like. Designated area 108 may be defined and monitored by a detection system server 106 that utilizes WiFi-based, global systems for mobile communications (GSM)-based, Bluetooth-based (e.g., Bluetooth handshaking), cellular-based, and/or global positioning system (GPS) based technologies. For example, detection system server 106 may include a WiFi based router associated with a merchant entity that detects the presence of a mobile device user's mobile device 102 within a WiFi range, e.g., designated area 108. In one embodiment, mobile device 102 may utilize a service set identifier (SSID) associated with detection system server 106 and provide an identifier associated with mobile device 102 that has been registered and is recognized by detection system server 106. In another embodiment, WiFi, cellular and or GPS positioning solutions using triangulation may be employed to detect mobile device 102. For example, detection system server 106 may utilize a plurality of routers that, upon communicating with mobile device 102 (e.g., upon receiving one or more mobile device user presence signals that include an SSID and recognizable mobile device identifier), may determine the position of mobile device 102 and may generate an alert to an on-site merchant server 104 that mobile device 102 has entered or been activated in a designated area (e.g., utilizing coordinates to define boundaries of a store, a parking lot, or a specific parking spot).

For example, a mobile device 102 may be carried into or turned on in a designated service area 108. A detection system server 106 in a merchant store may be used to monitor and define a designated area 108 by utilizing the range of WiFi-based, GSM-based, Bluetooth-based, cellular-based, and/or global positioning system (GPS) based technologies. For example, detection system server 106 may include a WiFi based router associated with a merchant entity may detect the presence of a mobile device user's mobile device 102 within a WiFi range, e.g., area surrounding the merchant store location (e.g., designated area 108).

In one embodiment, mobile device 102 may utilize a service set identifier (SSID) associated with detection system server 106 and provide a mobile device or mobile device user identifier that is recognized by detection system server 106 (e.g., via prior registration). In another embodiment, detection system server 106 may utilize WiFi triangulation, cellular triangulation and or GPS triangulation solutions to detect mobile device 102. For example, detection system server 106 may utilize a plurality of WiFi routers that upon communication with (e.g., upon exchanging WiFi signals that include an SSID and recognizable mobile device identifier) mobile device 102, may determine the geographical position of mobile device 102. If mobile device 102 enters or is activated within the designated area 108, detection system server 106 may generate an alert message (e.g., a customer presence signal) to on-site merchant server 104 to indicate the arrival/presence of mobile device 102. For example, certain WiFi or GPS coordinates may be predefined to correspond with a particular area or the entrance associated with the merchant location. In one embodiment, a user of mobile device 102 may utilize an application to initiate communication (i.e., initiate the detection process) with detection system 106 after arriving at the merchant location. After mobile device 102 is identified/detected at or near the merchant location entrance, on-site merchant server 104 may communicate directly with TMS 105, CMS 109, and/or backend merchant server 110 in the manner described above. For example, on-site merchant server 104 may be configured to provide a TLC and a mobile device user identifier (e.g., an Internet protocol (IP) address or a telephone number) to at least one of TMS 105, CMS 109, and/or backend merchant server 110.

In one embodiment, once mobile device 102 is identified/detected in the vicinity of designated area 108, detection system server 106 may communicate directly with backend merchant server 110 directly or via on-site merchant server 104 and/or TMS 105. For example, detection system server 106 may provide a mobile device user identifier associated with mobile device 102 and a TLC to TMS 105. TMS 105 may then use the TLC to communicate with backend merchant server 110, which in turn utilizes the mobile device user identifier to determine if the local flavor application has been previously downloaded on mobile device 102 or not.

Upon determining that application module has been previously downloaded, backend merchant server 110 may determine that the local flavor content data to be downloaded includes a local flavor application trigger code to initiate the correct application. For example, mobile device 102 may preloaded with a plurality of local flavor applications. Upon arriving at a given store location and interfacing with a touch point, a particular local flavor application trigger code may be wireless received by mobile device 102. In such an embodiment, a local flavor application trigger code may be provided to mobile device 102 which causes the correct local flavor application to activate.

In one instance, the local flavor application may be triggered by a WiFi signal, a GPS signal, or a triangulation signal that is transmitted by the store entity and is received by mobile device 102 upon entering the store location or being within proximity of a certain distance of the entrance of the store. In embodiments such as these, the local flavor application has already been previously loaded on mobile device 102 and is being automatically accessed.

In one embodiment, mobile device 102 includes a generic application 114 that may be modified by any one of a plurality of local flavor content data stored in application storage 117. Generic application 114 may be an application that is unrelated to any specific site or merchant location and may be used in a normal fashion. For example, generic application 114 may include an electronic payment card application that facilitates electronic credit card transactions with any wireless device reader. However, if local flavor content data associated with a particular merchant store is utilized by generic application 114, a local flavor application usable by mobile device 102 may be formed. Notably, the local flavor content data is applied to (e.g., loaded into) the generic application 114 in order to convert the generic application into a local flavor application that is associated to the designated merchant store location or site. In one embodiment, the generated local flavor application is customized for use at the designated area. For example, the generic application 114 (e.g., a generic electronic payment card application) may be converted into a local flavor application, e.g., a merchant specific payment card application (e.g., an electronic softcard), that is only accepted at the merchant location and may afford the mobile device user benefits that are unique to the merchant location. Other exemplary benefits may include accumulating loyalty points or applying a discount at the time of a purchase transaction. Similarly, the utilization of the local flavor content data by generic application 114 may also provide electronic coupons related to the products carried by the merchant entity at the present location. In one embodiment, the local flavor application is used to provide at least one of inventory information, location information, and promotional information associated with the designated area (i.e., the merchant store location). For example, the local flavor application may also be used to suggest other products to purchase based on shelf tags or product tags interfaced by the mobile device utilizing the local flavor application. In another embodiment, the local flavor application may be used to provide information, such as recipes, based on shelf tags or product tags interfaced by the mobile device utilizing the local flavor application.

In another embodiment, generic application 114 may include a generic retailer application in mobile device 102 that functions as a parent application that is configured to function in multiple store locations/sites associated with a particular merchant or retailer. Notably, the generic retailer application may be a generic retailer application that converts into a local flavor application by utilizing local flavor content data that is provided to mobile device 102 upon initiation of the mobile device interfacing with the smart tag or the mobile device being detected in by a detection system server. In one embodiment, if the mobile device 102 is interfaced with a touch point, local flavor content data of the retailer application being used may be provisioned on mobile device 102. The local flavor content data may include retailer store map information which can be used by the mobile device user to find the location of a specific department (e.g., shoe department) in that particular retailer store location. Also, the local flavor content data may contain or enable mobile device 102 to use coupons/offers or sales information advertised by that particular retailer store.

Figure 2:
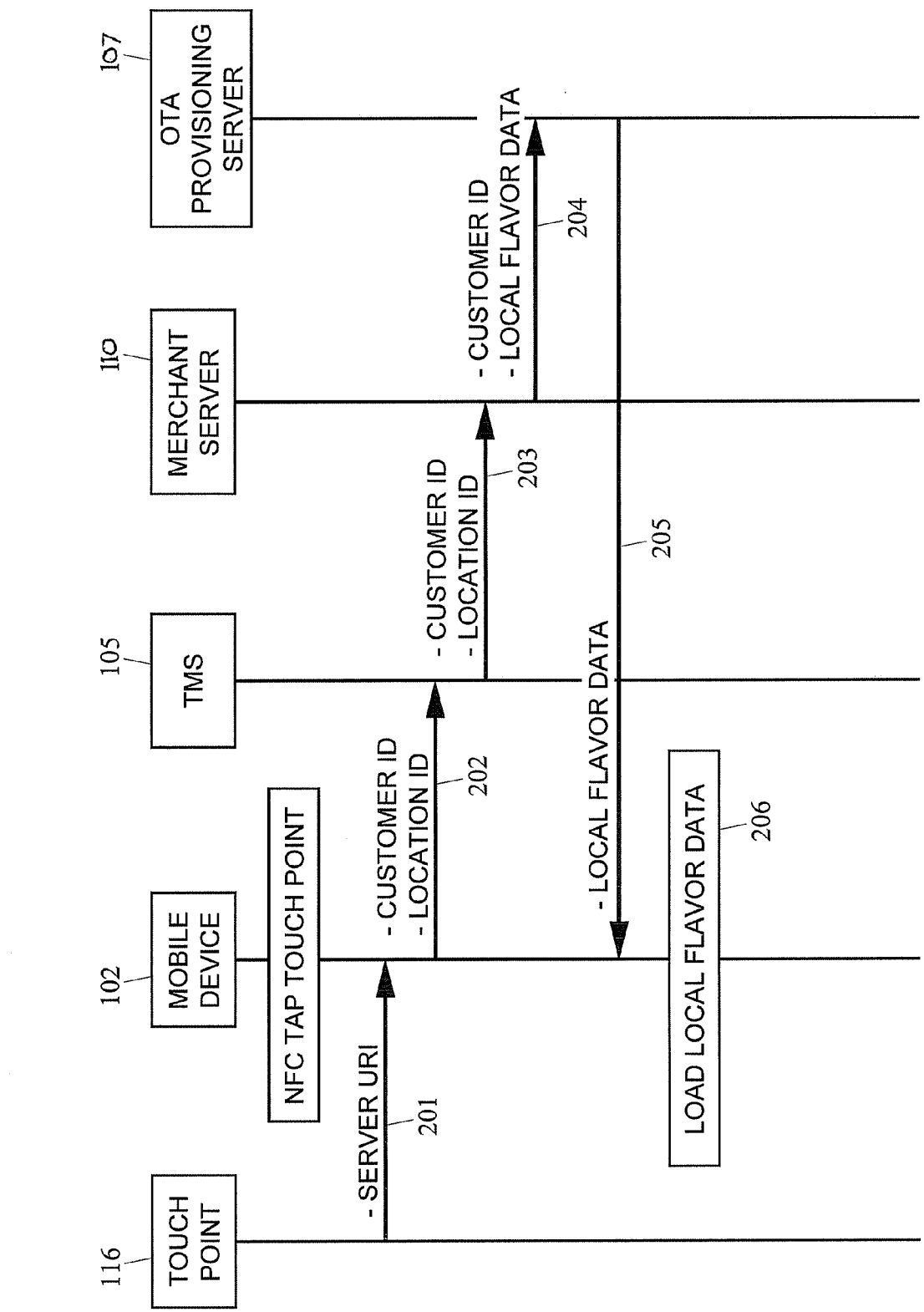
FIG. 2 is a signal flow diagram illustrating an exemplary signaling sequence for provisioning location specific content information to a mobile device according to an embodiment of the subject matter described herein.

FIG. 2 depicts an exemplary signaling sequence for provisioning location specific content information (i.e., local flavor content data) to a mobile device according to an embodiment of the subject matter described herein. For example, mobile device 102 may be used to interface with smart poster 116 via an NFC tap. In one embodiment, smart poster 116 may be located at the entrance of a merchant location, such as a department store or shopping mall. In response to the NFC tap, mobile device 102 receives a signal 201 containing a server address identifier (e.g., a URI of TMS 105) and a location identifier, such as a tag location code (TLC). In one embodiment, a TLC includes a code that may be used to identify the locate local flavor content data associated with the site in which the interfaced touch point is located as well as the entity that hosts the local flavor content data (e.g., a merchant server).

Upon receiving the information contained in message 201, mobile device 102 uses the received URI address information to send data to TMS 105. For example, mobile device 102 may use the URI address associated with TMS 105 to send a signal 202 containing a mobile device user identifier, such as a customer identifier, and the TLC to TMS 105. TMS 105 may then utilize the TLC to access a CMS or a local and/or external database (e.g., that cross-references TLCs with merchant server addresses/locations) to determine the proper backend merchant server 110 associated with the interfaced touch point, i.e., smart poster 116. After determining the appropriate merchant server 110, TMS 105 forwards the mobile device user identifier and the TLC to merchant server 110 via signal 203. In one embodiment, signal 203 is instead forwarded to a CMS, which in turn uses the TLC to locate merchant server 110. The identified merchant server 110 may then use the TLC to access and obtain (e.g., in a local or external database storage, such as database 111) the local flavor content data associated with the physical site (e.g., a merchant store) where smart poster 116 is located.

Merchant server 110 may then forward, via signal 204, the local flavor content data and the mobile device user identifier (e.g., a customer identifier in the form of a phone number) to an OTA provisioning server 107 (via signal 204), which in turn uses the mobile device user identifier to wirelessly send the local flavor content data to mobile device 102 (via signal 205). In one embodiment, signal 204 may be sent to OTA provisioning server 107 via a CMS 109. In one embodiment, the local flavor content data includes a complete local flavor application that may be executed by wallet application 112. In another embodiment, the local flavor content data may include a local flavor application trigger code that triggers the selection and execution of an existing (i.e., previously stored) local flavor application in mobile device 102. In yet another embodiment, the local flavor content data may include data that, allows the generic application 114 to provide the user with a functioning local flavor application customized for use at the designated location.

Upon receiving the local flavor content data, mobile device 102 may provision and/or store the local flavor content data in its memory 103 (block 206), which may comprise non-secure baseband memory. Alternatively, the local flavor content data may be stored by mobile device 102 in a secure element if the local flavor content data includes sensitive, confidential, and/or valuable information. Afterwards, mobile device 102 may be used to run the local flavor content data to provide the customer with a customized experience that is specific to that location site (block 207).

Figure 3:
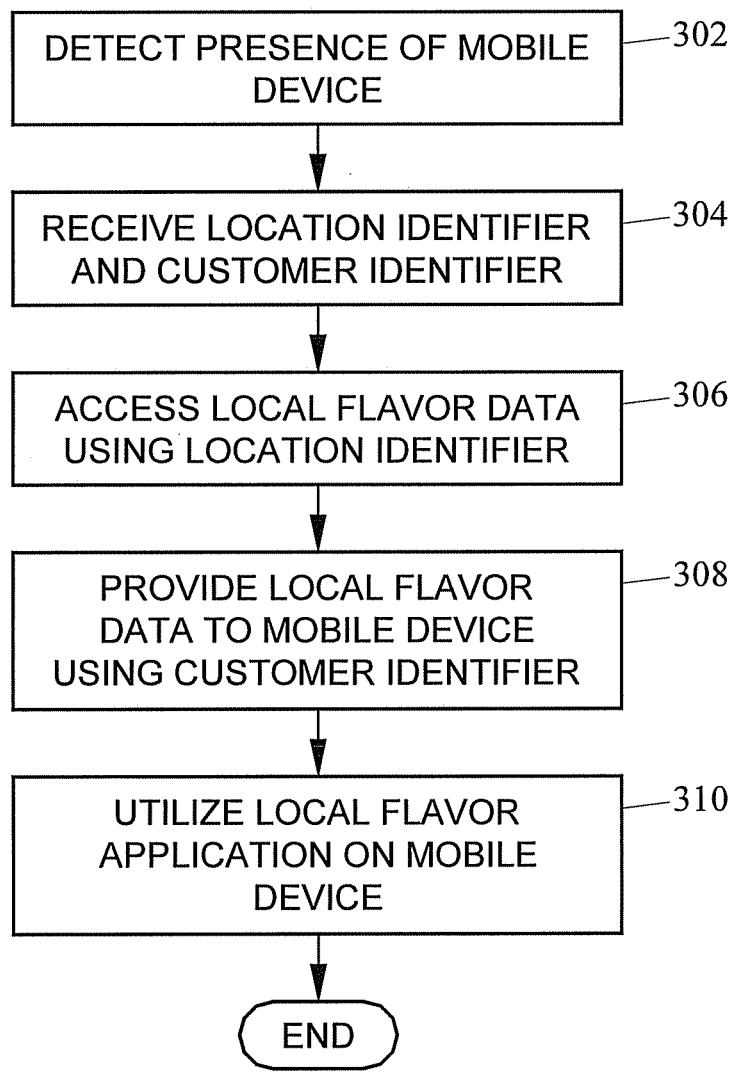
FIG. 3 is a flow chart illustrating an exemplary process for provisioning location specific content information to a mobile device according to an embodiment of the subject matter described herein.

FIG. 3 is a flow chart illustrating an exemplary process 300 for provisioning location specific content information to a mobile device according to an embodiment of the subject matter described herein. In block 302, the presence of the mobile device user's mobile device 102 is detected by a detection device. In one embodiment, the detection device includes a detection system server 106 (as shown in FIG. 1) at a designated area, such as a merchant store location, detects the presence of a customer's mobile device. For example, mobile device 102 may be carried into or turned on in designated area 108, which is associated with the merchant store location. Designated area 108 may also include a WiFi service area that is created by a range-based WiFi detection system server 106 at the merchant location. In one embodiment, designated area 108 is defined by the range of a WiFi router. For example, the designated area may include the merchant location that is contained within the range of a WiFi router. In an alternate embodiment, detection system server 106 may utilize a plurality of routers to detect the presence of the mobile device via WiFi triangulation. In yet another embodiment, cellular (e.g., GSM) triangulation and/or GPS triangulation solutions may be employed to detect the presence of a registered mobile device. Notably, detection system server 106 is configured to recognize a mobile device user's mobile device presence in a designated area (e.g., a store entrance or a parking lot space). In yet another embodiment, the detection device may include a touch point. For example, mobile device 102 may be detected by being interfaced with or tapped on a touch point (e.g., a smart poster 116) in a merchant store or other geographical area or site.

In block 304, a location identifier and a mobile device user identifier are received. In one embodiment, wallet application 112 may send the location identifier and the mobile device user identifier (e.g., phone number of mobile device 102) to a network element that is identified by a URI obtained from smart poster 116. For example, TMS 105 may receive a local flavor content request from wallet application 112. TMS 105 may be configured to obtain the local flavor content data either by making a request to one of a plurality of merchant servers 110 (via CMS 109). In an alternate embodiment, detection system server 106 detects the local presence of a registered mobile device 102 via WiFi. Detection system server 106 may then provide the mobile device user identifier and a location identifier to an appropriate network element, such as TMS 105, CMS 109, and/or backend merchant server 110. In one embodiment, detection system server 106 may inform backend merchant server 110 via on-site merchant server 104 that mobile device 102 was detected in designated area 108 via a WiFi router or via a triangulation technology (e.g., via WiFi, GPS, or cellular triangulation). For example, upon detecting mobile device 102, detection system server 106 may communicate a mobile device user identifier to merchant server 110 (either directly or via TMS 105 or merchant server 104).

In block 306, local flavor content data is accessed using the location identifier. In one embodiment, merchant server 110 may cross-reference the previously received location identifier (e.g., a TLC) in order to identify and obtain the appropriate local flavor content data by accessing a database 111, which maps local flavor content data to location identifiers. In one embodiment, the local flavor content data includes a complete local flavor application that may be executed by wallet application 112. In another embodiment, the local flavor content data may include a local flavor application trigger code that triggers the selection and execution of an existing (i.e., previously stored) local flavor application in mobile device 102. In yet another embodiment, the local flavor content data may include data that, allows the generic application 114 to provide the user with a functioning local flavor application customized for use at the designated location.

In block 308, local flavor content data is provided to the mobile device. In one embodiment, merchant server 110 may utilize the mobile device user identifier to send the local flavor content data to mobile device 102. For example, merchant server 110 may forward the phone number of mobile device 102 and the local flavor content data to OTA provisioning server 107. OTA provisioning server 107 may then use the mobile device user identifier to direct the local flavor content data to be provisioned in memory 103 of mobile device 102. In one embodiment, OTA provisioning server 110 may deliver the local flavor content to mobile device 104 via an IP network, a cellular network, or a similar wireless network.

In block 310, the local flavor application on the mobile device is utilized. In one embodiment, once the local flavor content data is provisioned on mobile device 102, wallet application 112 (which is executed by processor 113) executes the generic application 114 along with the local flavor content data such that the generated local flavor application is customized for use at the designated area. For example, the generic application 114 (e.g., a generic electronic payment card application) may be converted into a local flavor application, e.g., a merchant specific payment card application (e.g., an electronic softcard), that is only accepted at the merchant location and may afford the mobile device user benefits that are unique to the merchant location. In an alternate embodiment, the received local flavor content data may include a local flavor application trigger code that when executed by wallet application 112, starts up a related (previously stored) local flavor application residing in application storage 117 of mobile device 102.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for utilizing local flavor content data in a mobile device, the system comprising:

a touch point located at a specific merchant store location configured to provide, upon being interfaced via near field communications (NFC) by a mobile device, a location identifier to the mobile device, wherein the location identifier is associated with the specific merchant store location, wherein the touch point includes a smart poster, an NFC contactless tag, a point of sale device, or a wireless reader device; and a backend server configured for receiving the location identifier associated with the specific merchant store location and a mobile device user identifier associated with the mobile device, for utilizing the location identifier to obtain local flavor content data, for providing the local flavor content data to the mobile device using the mobile device user identifier, wherein the local flavor content data provides customized information unique to the specific merchant store location, and for applying the local flavor content data to a generic application in the mobile device to generate a local flavor application that is customized for use at the specific merchant store location, wherein the generic application includes a generic electronic payment card application that converts, upon applying the local flavor content data to the generic application, into a merchant specific payment card application that is customized for use at the specific merchant store location such that the merchant specific payment card application is useable for a purchase transaction at the specific merchant store location only and provides a benefit to a user of the mobile device that is unique only to the specific merchant store location upon use during the purchase transaction, and wherein the generic application is stored in memory of the mobile device and is executed by a processor via a wallet application in the mobile device, wherein the specific merchant store location is a unique geographical site that the user of the mobile device is visiting.

2. The system of claim 1 wherein the backend server provides the local flavor content data to the mobile device via an over the air (OTA) provisioning server.

3. The system of claim 1 wherein the mobile device includes a near-field communications (NFC) enabled mobile device and is configured to receive the location identifier via NFC.

4. The system of claim 1 wherein the mobile device user identifier includes at least one of: an Internet protocol (IP) address and a telephone number associated with the mobile device.

5. The system of claim 1 wherein the local flavor application is used to provide at least one of: inventory information, location information, and promotional information associated with the specific merchant store location.

6. A method for provisioning location specific content information to a mobile device, the method comprising:
receiving, from a mobile device, a location identifier associated with a specific merchant store location and a mobile device user identifier associated with the mobile device at a backend server, wherein the location identifier is obtained by the mobile device from a touch point located at the specific merchant store location in response to the mobile device interfacing with the touch point via NFC, wherein the touch point includes a smart poster, an NFC contactless tag, a point of sale device, or a wireless reader device;
utilizing the location identifier to obtain local flavor content data, wherein the local flavor content data provides customized information unique to the specific merchant store location;
providing the local flavor content data to the mobile device using the mobile device user identifier; and
applying the local flavor content data to a generic application in the mobile device to generate a local flavor application that is customized for use at the specific merchant store location, wherein the generic application includes a generic electronic payment card application that converts, upon applying the local flavor content data to the generic application, into a merchant specific payment card application that is customized for use at the specific merchant store location such that the merchant specific payment card application is useable for a purchase transaction at the specific merchant store location only and provides a benefit to a user of the mobile device that is unique only to the specific merchant store location upon use during the purchase transaction, and wherein the generic application is stored in memory of the mobile device and is executed by a processor via a wallet application in the mobile device, wherein the specific merchant store location is a unique geographical site that the user of the mobile device is visiting.

7. The method of claim 6 wherein receiving the location identifier and the mobile device user identifier includes receiving, from the mobile device, the mobile device user identifier and the location identifier in response to the touch point being interfaced with the mobile device.

8. The method of claim 6 wherein the local flavor content data is provided to the mobile device via an over the air (OTA) provisioning server.

9. The method of claim 6 wherein the mobile device includes a near-field communications (NFC) enabled mobile device and is configured to receive the location identifier via NFC.

10. The method of claim 6 wherein the mobile device user identifier includes at least one of: an Internet protocol (IP) address and a telephone number associated with the mobile device.

11. The method of claim 6 wherein the local flavor application is used to provide at least one of: inventory information, location information, and promotional information associated with the specific merchant store location.

12. A non-transitory computer readable medium having stored thereon comprising computer executable instructions that when executed by a processor of a computer performs steps comprising:
receiving, from a mobile device, a location identifier associated with a specific merchant store location and a mobile device user identifier associated with the mobile device at a backend server, wherein the location identifier is obtained by the mobile device from a touch point located at the specific merchant store location in response to the mobile device interfacing with the touch point via NFC, wherein the touch point includes a smart poster, an NFC contactless tag, a point of sale device, or a wireless reader device;
utilizing the location identifier to obtain local flavor content data, wherein the local flavor content data provides customized information unique to the specific merchant store location;
providing the local flavor content data to the mobile device using the mobile device user identifier; and
applying the local flavor content data to a generic application in the mobile device to generate a local flavor application that is customized for use at the specific merchant store location, wherein the generic application includes a generic electronic payment card application that converts, upon applying the local flavor content data to the generic application, into a merchant specific payment card application that is customized for use at the specific merchant store location such that the merchant specific payment card application is useable for a purchase transaction at the specific merchant store location only and provides a benefit to a user of the mobile device that is unique only to the specific merchant store location upon use during the purchase transaction, and wherein the generic application is stored in memory of the mobile device and is executed by a processor via a wallet application in the mobile device, wherein the specific merchant store location is a unique geographical site that the user of the mobile device is visiting.

* * * * *